United States Patent [19]

Suzuki

[11] Patent Number: 4,597,014

[45] Date of Patent: Jun. 24, 1986

[54] SOLID-STATE IMAGE PICKUP DEVICE

[75] Inventor: Shigeo Suzuki, Tokyo, Japan

[73] Assignee: Asahi Kogaku Kogyo Kabushiki Kaisha, Tokyo, Japan

[21] Appl. No.: 571,170

[22] Filed: Jan. 16, 1984

[30] Foreign Application Priority Data

Jan. 14, 1983 [JP] Japan .................................. 58-4739
Jan. 27, 1983 [JP] Japan ................................ 58-11660

[51] Int. Cl.⁴ ............................................. H04N 3/14
[52] U.S. Cl. .................................. 358/213; 358/909; 358/228
[58] Field of Search ............... 358/213, 212, 906, 909, 358/227, 228

[56] References Cited

U.S. PATENT DOCUMENTS

| 4,057,830 | 11/1977 | Adcock ................................ | 358/127 |
| 4,131,919 | 12/1978 | Lloyd et al. ............................ | 360/9 |
| 4,334,151 | 6/1982 | Herbst et al. ....................... | 250/201 |
| 4,420,773 | 12/1983 | Toyoda et al. ...................... | 358/335 |
| 4,489,350 | 12/1984 | Kimura ................................. | 358/213 |

Primary Examiner—Gene Z. Rubinson
Assistant Examiner—Robert G. Lev
Attorney, Agent, or Firm—Sughrue, Mion, Zinn, Macpeak, and Seas

[57] ABSTRACT

A solid-state image pickup device and a still picture recording device in which blooming and vertical smearing are eliminated. A drive circuit applies vertical and horizontal synchronizing signals to an image pickup element or area image sensor, and an exposure control circuit applies an exposure time control signal thereto for controlling the length of the exposure time according to the intensity of the image light exposing the pickup element or sensor. A scanning stopping circuit stops the application of the synchronizing signals to thereby stop the scanning of the area image sensor for a period of time starting from a time before the start of exposure until the occurrence of a first pulse of the vertical synchronizing signal after application of the exposure time control signal.

4 Claims, 11 Drawing Figures

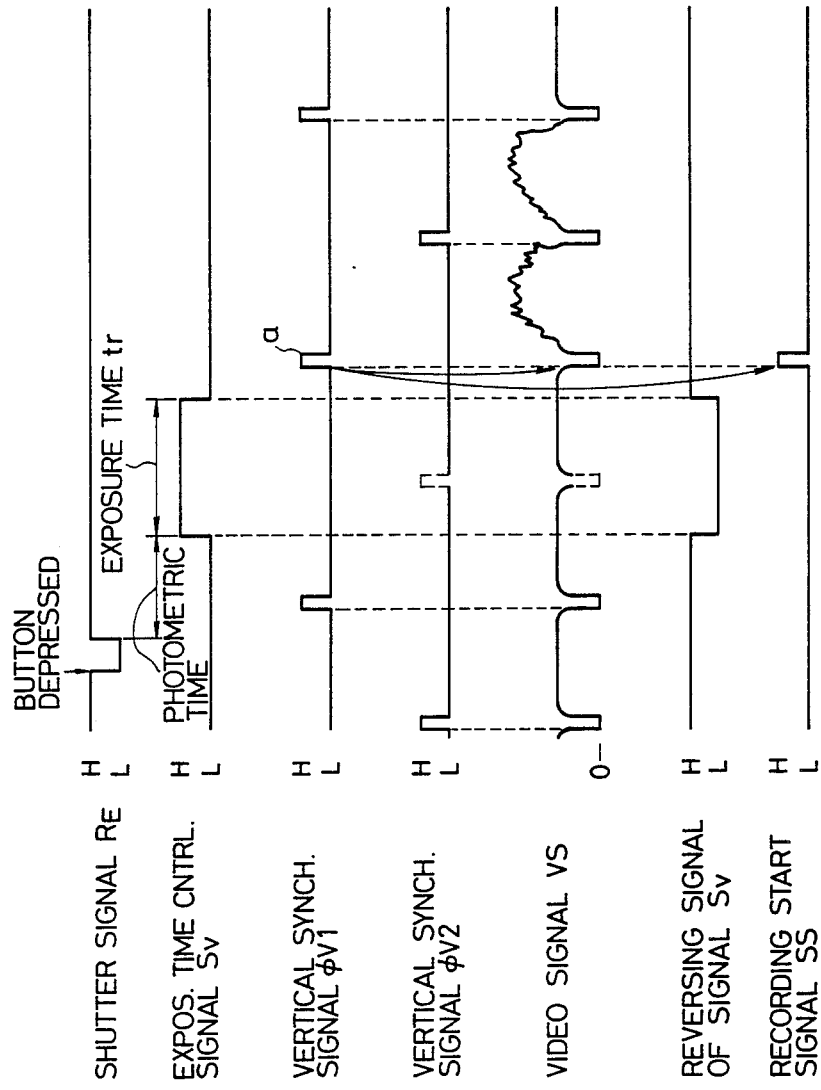

SOLID-STATE IMAGE PICKUP DEVICE

BACKGROUND OF THE INVENTION

The present invention relates to a solid-state image pickup device. Image pickup tubes are most extensively employed as image pickup devices. In addition to image pickup tubes, recently, area image sensors have been used. The area image sensors include MOS, CCD, CPD and BBD types. These elements have a wide range of application because, compared with the image pickup tube, they are small in size, light in weight, semi-permanent in service life and low in power consumption.

There are many cases in which an area image sensor is used to convert an optical variation into an electrical signal, namely, a video signal, whereby the picture is reproduced on a television monitor according to the electical signal, or the video signal is recorded with a VTR. In this connection, optical variations in a sensed image are converted into a video signal. To produce a still picture video signal, an exposure time such as 1/30 second or 1/60 second is employed. That is, the exposure time of the area image sensor is fixedly set at 1/30 second or 1/60 second. Accordingly, in the case when the image light is high in intensity, the exposure may be saturated, and hence blooming may result. Even if the exposure is not saturated, vertical smearing is liable to occur.

These difficulties also occur in the case in which an ordinary image pickup tube is used. That is, since the time for the image pickup tube to integrate the image light is fixed as described above, the quantity of light is inadequate when the image is dark and it is excessive when the image is bright.

In view of the foregoing, an object of the present invention is to provide a solid-state image pickup device in which, in producing a still picture video signal with an area image sensor, no blooming or vertical smearing occurs.

SUMMARY OF THE INVENTION

The foregoing object of the invention has been achieved by the provision of a solid-state image pickup device including an area image sensor, a drive circuit for applying to the image sensor a vertical synchronizing signal and a horizontal synchronizing signal having predetermined periods, and an exposure control circuit for applying to the image sensor an exposure time control signal used to control an exposure time according to the light intensity of the sensed image light. There is further provided a scanning stopping circuit for stopping the application of the synchronizing signals from the drive circuit to the area image sensor to stop the scanning of the area image sensor for a period of time which elapses from the time before the start of exposure until the first occurrence of a vertical synchronizing signal pulse following the exposure time control signal.

The foregoing object of the invention has also been achieved by the provision of a still picture recording device which, according to the invention, includes an area image pickup element, a drive circuit for applying to the image pickup element a vertical synchronizing signal and a horizontal synchronizing signal having predetermined periods, an exposure control circuit for applying an exposure time control signal to the area image pickup element with the exposure time control signal being used to control the exposure time according to the intensity of the image light, a recording device for recording a video signal provided by the image pickup element, and a still picture control circuit for stopping the operation of the drive circuit within the exposure time, the still picture control circuit starting the reading of charges accumulated in the image pickup element in synchronization with a pulse of the vertical synchronizing signal which occurs immediately after the exposure time has passed, while simultaneously causing the recording device to start recording the video signal.

BRIEF DESCRIPTION OF THE DRAWINGS

FIG. 9 is a timing chart describing the operation of the third embodiment.

DESCRIPTION OF THE PREFERRED EMBODIMENTS

Figure 1A:
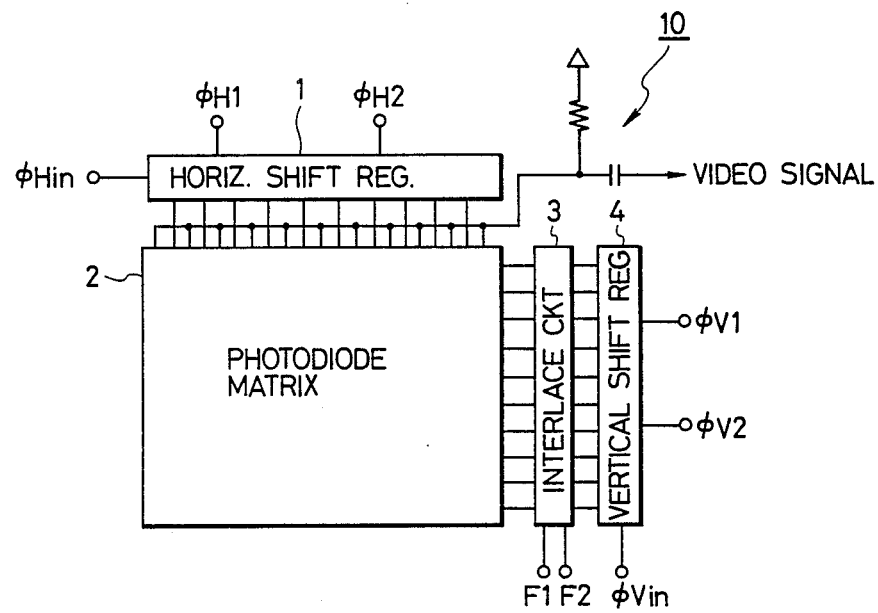
FIGS. 1A and 1B are explanatory diagrams showing the arrangements of two examples of an area image sensor used with the invention.

The invention will now be described with reference to preferred embodiments shown in the accompanying drawings. In the various figures of the drawings, like parts are designated by like reference numerals or characters.

Figure 1B:
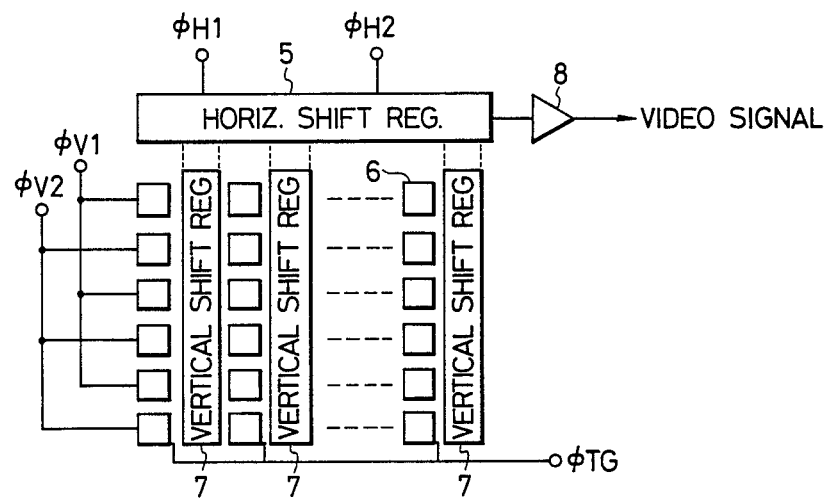

FIG. 1A shows the arrangement of one example of an area image sensor 10, which has a horizontal shift register 1 which generates and applies to a photodiode matrix 2 horizontal synchronizing pulses for successively reading in the horizontal direction picture elements corresponding to picture elements 6 in FIG. 1B. $\phi_{H1}$ and $\phi_{H2}$ designate pulse signals used for driving the horizontal shift register 1 in the horizontal direction. The area image sensor 10 further includes a vertical shift register 4 used for successively selecting horizontal lines of picture elements of the matrix 2, and an interlace circuit 3 for performing an interlaced scanning operation. In FIG. 1A, $F_1$ and $F_2$ designate field control signals; $\phi_{V1}$ and $\phi_{V2}$, pulse signals used to select lines in response to the signals $F_1$ and $F_2$; $\phi_{Vin}$, a pulse signal used for returning the vertical scanning to its start point every field (each or every 16.7 ms), the signal $\phi_{Vin}$ being termed a "vertical synchronizing signal"; and $\phi_{Hin}$, a pulse signal used for returning the horizontal scanning to its start point every horizontal scanning period (such as every 63.5 microseconds), the signal $\phi_{Hin}$ being termed "a horizontal synchronizing signal". The horizontal shift register 1 and the vertical shift register 4 are of the MOS type.

FIG. 1B shows another example of the area image sensor employed in the invention. In this example, instead of the signals $\phi_{V1}$, $\phi_{V2}$, $\phi_{H1}$, $\phi_{H2}$, $F_1$ and $F_2$ used in the sensor of FIG. 1, a transfer gate pulse signal $\phi_{TG}$ is employed. The area image sensor has a horizontal shift register 5 and a vertical shift register 7 implemented with CCDs, device picture elements 6, and an CCD type output buffer.

In each of the above-described area image sensors, similar to the scanning operation of a television set, the signals stored in the picture elements of the photodiode matrix 2 are sequentially read out to form a video signal for one picture.

Figure 2:
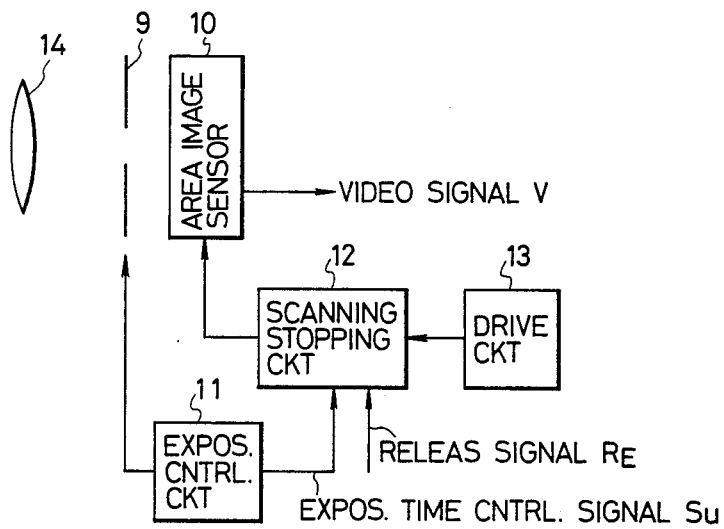
FIG. 2 is a block diagram showing a first embodiment of a pickup device of the invention.

FIG. 2 is a block diagram showing a solid-state image pickup device according to one embodiment of the invention. In the device, a lens 14, a diaphragm 9 and an area image sensor 10 are arranged on the optical axis. The device includes a drive circuit 13 which applies a vertical synchronizing signal and a horizontal synchronizing signal with predetermined periods to the area image sensor 10, an exposure control circuit 11 which applies an exposure time control signal to the area image sensor 10 for controlling the exposure time according to the intensity of the image light, and a scanning stopping circuit 12. The scanning stopping circuit 12 operates to suspend the application of the synchronizing signals from the drive circuit 13 to the area image sensor 10, thereby to stop the scanning during the period of time which elapses from the time instant before the start of exposure until the first pulse of the vertical synchronizing signal occurs immediately after the exposure time control signal goes to the inactive state.

The scanning stopping circuit 12 can stop the scanning at (1) the time when the exposure time control signal starts, or (2) the time when the vertical synchronizing signal starts immediately after the release button is pushed. The scanning can be stopped at either one of these times; however, the scanning should be started again upon the occurrence of the first pulse of the vertical scanning signal immediately after the exposure time control signal has ended.

Figure 3:
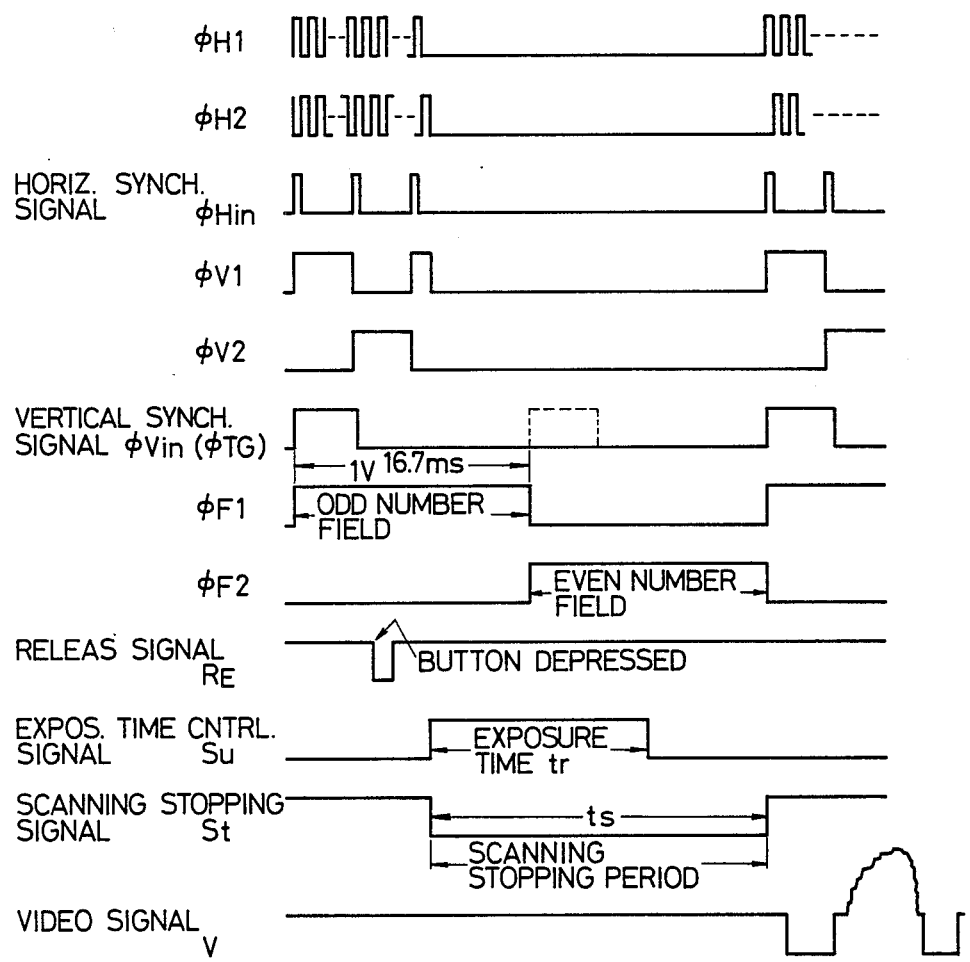
FIG. 3 is a timing chart for the first embodiment shown in FIG. 2.

FIG. 3 is a timing chart describing the operation of the above-described device. Whenever one pulse of the horizontal synchronizing signal $\phi_{Hin}$ is produced, pulses of the signals $\phi_{H1}$ and $\phi_{H2}$ are generated, the number of which is equal to the number of picture elements 6 in the horizontal direction in the area image sensor 10. One pulse of the vertical synchronizing signal $\phi_{Vin}$ (or $\phi_{TG}$) is produced for every field. In response to the pulse of the vertical synchronizing signal $\phi_{Vin}$ thus produced, a pulse of the signal $\phi_{V1}$ is produced for every other line of picture elements 6, thus accomplishing the scanning of one field (assumed here to be an odd number field). Thereupon, the next pulse of the synchronizing signal $\phi_{Vin}$ is produced. In response to the pulse of the signal $\phi_{Vin}$, a pulse of the signal $\phi_{V2}$ is produced for every other line of picture elements which have not yet been scanned, thus accomplishing the scanning of the next field (assumed here to be an even number field). While these scanning operations are repeatedly carried out, the area image sensor 10 is driven.

When the release button is depressed during the above-described operation, a release signal RE is produced. Immediately after the production of the release signal RE, a photometric operation is carried out with a light intensity detecting device (not shown) to determine an exposure time $t_r$ according to the intensity of field light. Thereafter, the shutter is opened for the exposure time. When the shutter is opened, a scanning stopping signal $S_t$ is produced, which has a duration for the occurrence of the first pulse of the horizontal shutter has been closed. The scanning of the area image sensor 10 is suspended by the scanning stopping signal $S_t$ for a scanning stopping period $t_s$. Following the next pulse of the vertical synchronizing signal $\phi_{Vin}$, the video signal is read.

The above description applies only to the case in which the the device employs an MOS type area image sensor. In the case where the device uses a CCD type area image sensor employing an interline transfer system, only the pulse signal $\phi_{TG}$ should be stopped during the scanning stopping period $t_r$.

Figure 4A:
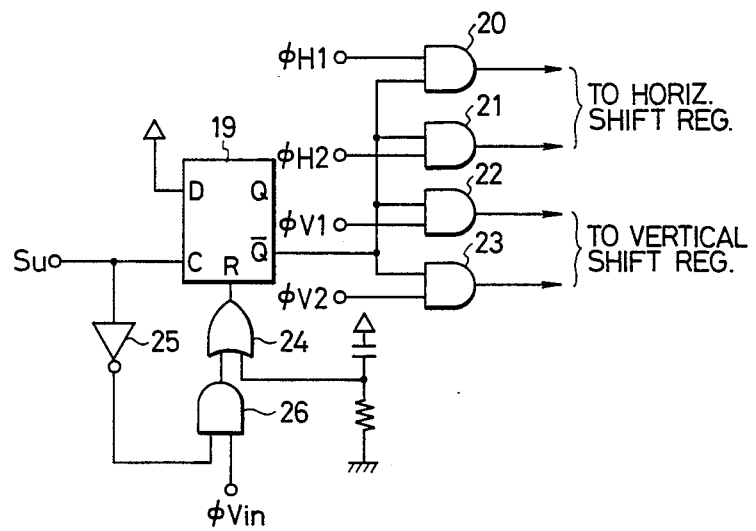
FIGS. 4A and 4B are circuit diagrams showing two examples of a scanning stopping circuit for use in the device of in FIG. 2.
Figure 4B:
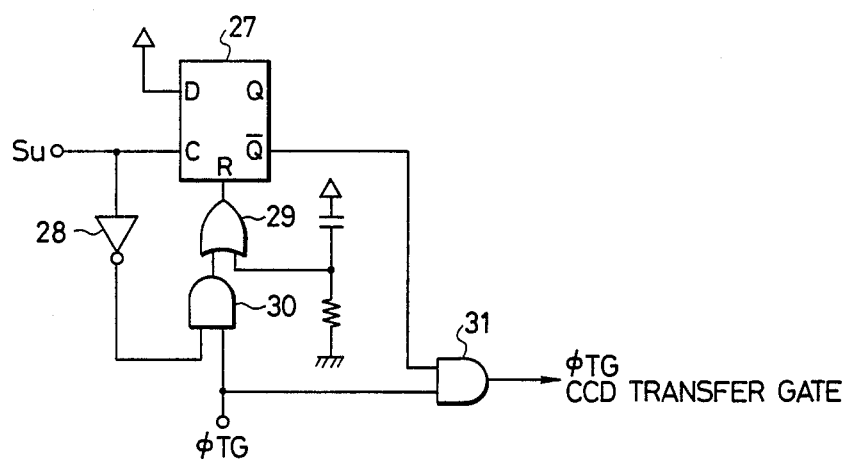

FIGS. 4A and 4B show two examples of the scanning stopping circuit 12 in FIG. 2. The circuit in FIG. 4A is primarily intended for use with the MOS type area image sensor, and the circuit in FIG. 4B for the interline CCD type area image sensor. In these figures, reference numerals 19 and 27 designate D type flip-flops; 20, 21, 22, 23, 26, 30 and 31, AND gates; 25 and 28, inverters; and 24 and 29 OR gates. When the power is applied to the circuit of FIG. 4A at an initial stage, a capacitor whose one end is connected to one of input terminals of the OR gate 24, is rendered conductive transiently to be charged. As a result, a voltage drop appears across a resistor connected in series with the capacitor. The voltage drop is applied to the OR gate 24 as a high level signal, and then applied to a reset terminal of the flip-flop circuit 19 to reset the circuit 19. After a certain period of time determined by the time constant of the series circuit of the resistor and the capacitor lapses, the current flowing through the resistor becomes zero so that the one input signal to the OR gate 24 is changed to the low level signal. Flip-flop circuits 27, 35 and 64 which are described in detail later are also reset in the same manner as that of the flip-flop circuit 19. As is apparent from FIGS. 4A and 4B, in the case of the MOS type area image sensor, it is necessary to stop several pulse signals, while in the case of the CCD type area image sensor, only one pulse signal ($\phi_{TG}$) need be stopped, and accordingly the operation in that case is quite simple.

Figure 5:
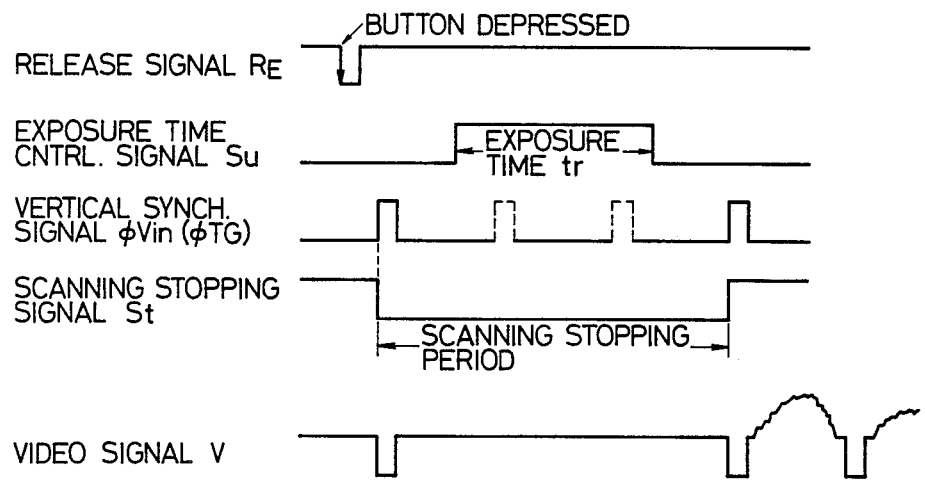
FIG. 5 is a timing chart for a second embodiment of the invention.

FIG. 5 is a timing chart relating to another embodiment of the invention. In this embodiment, scanning is stopped as in the above-described second case. When the release button is depressed, the release signal RE is set to the low level. The pulse of the vertical synchronizing signal ($\phi_{Vin}$ or $\phi_{TG}$) which occurs firstly after this time instant is detected. Simultaneously with the occurrence of the pulse of the vertical synchronizing signal, the above-described scanning stopping operation is carried out. Similarly as in the above-described case, the scanning stopping signal is set to its inactive state when a pulse of the vertical synchronizing signal is first produced after the exposure time control signal has ended. In other words, the period for which the scanning stopping signal is active is the scanning stopping period, during which time the drive pulse for driving the area image sensor is stopped.

Figure 6:
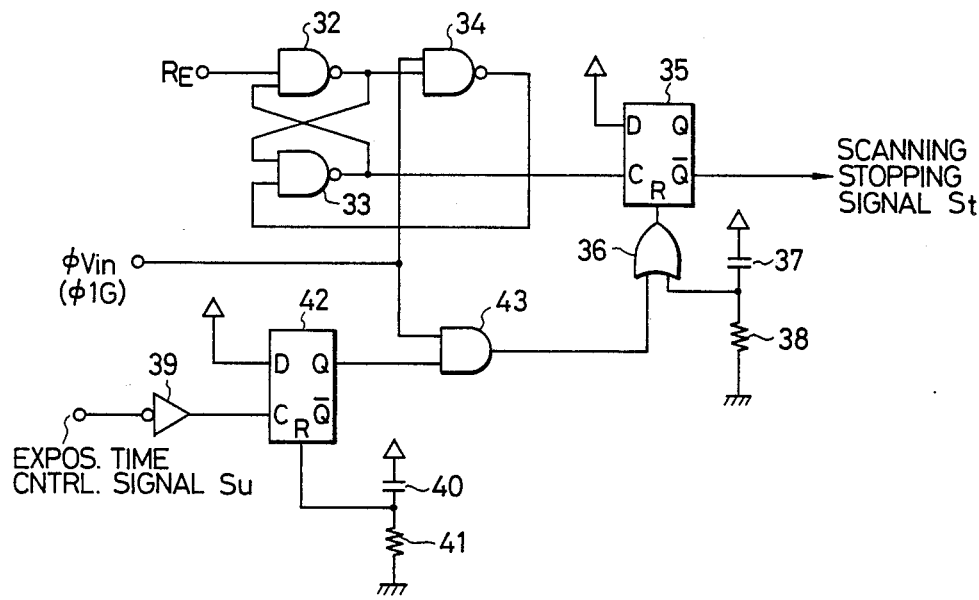
FIG. 6 is a circuit diagram showing a scanning stopping circuit used in the second embodiment, the operation of which is described with reference to FIG. 5.

FIG. 6 is a circuit diagram showing another example of a scanning stopping circuit 12 in FIG. 2, which performs the operation described with reference to FIG. 5. In FIG. 6, reference numerals 32, 33 and 34 designate NAND gates; 35 and 42, D type flip-flops; 36, an OR gate; 39, an inverter; 43, an AND gate; 37 and 40, capacitors; and 38 and 41, resistors.

The circuit of FIG. 6 operates as follows: Upon reception of the release signal RE, the output of the NAND gate 32, which together with the NAND gate 33 forms a flip-flop, is raised to the high level. Thereafter, a pulse of the vertical synchronizing signal $\phi_{Vin}$ ($\phi_{TG}$) is applied to the circuit, whereupon both inputs to the NAND gate 34 are high to set its output to the low level. This low level signal changes the state of the flip-flop circuit constituted by the NAND gates 32 and 33, and therefore the output of the NAND gate 33 is raised to the high level. This high level signal changes the state of the D-type flip-flop 35, which was reset to an initial state by a differentiating circuit composed of the capacitor 37 and the resistor 38. As a result, the output at the inverting output terminal of the flip-flop 35 is set to the low level, thus generating a pulse of the scanning stopping signal $S_t$.

The level of the exposure time control signal $S_u$ is inverted by the inverter 39. The signal $S_u$ thus processed changes the state of the D type flip-flop 42, which was reset to the initial state by a differentiating circuit constituted by the capacitor 40 and the resistor 41 at the time the exposure was ended, so that the output at the noninverting output terminal of the flip-flop 42 is raised to the high level. When this high level output and a pulse of the vertical synchronizing signal $\phi_{Vin}$ ($\phi_{TG}$) at the high level are applied to the AND gate 43, the output of the gate 43 goes to the high level, which, applied through the OR gate 36 to the flip-flop 35, resets the flip-flop 35. As a result, the output at the inverting output terminal thereof is raised to the high level, thus ending the scanning stopping period. The low level output at the inverting output terminal is the scanning stopping signal.

Figure 7:
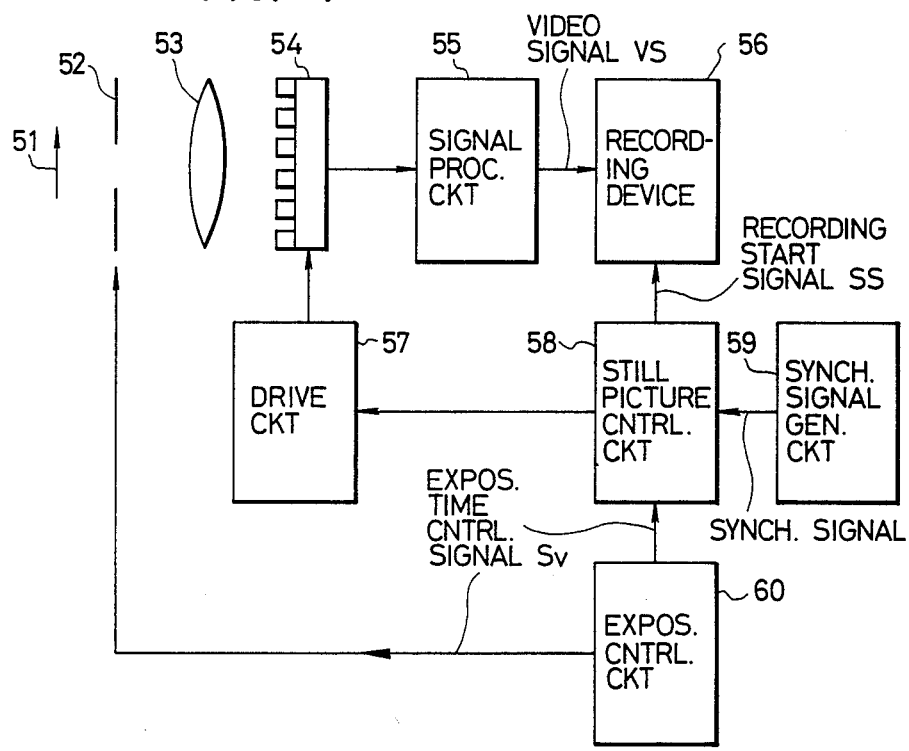
FIG. 7 is a block diagram of a third embodiment of the invention.

FIG. 7 is a block diagram showing another embodiment of the invention, namely, a still picture recording device. The device, as shown in FIG. 7, includes a diaphragm 52, a lens 53 and an image pickup element 54 arranged on the optical axis. Examples of the image pickup element 54 are the above-described area image sensors and other conventional image pickup tubes. The device further has a drive circuit 57 for applying a vertical synchronizing signal and a horizontal synchronizing signal having predetermined periods to the image pickup element 4, and an exposure control circuit 60 for applying an exposure time control signal Sv to the image pickup element 54 to control the exposure time according to the intensity of the image light. In FIG. 7, reference numeral 51 designates an object.

The device further includes a recording device 56 for recording a video signal VS which is applied through a signal processing circuit 55. The recording member 56 may be a video tape recorder or a video disc recorder. The device also has a still picture control circuit 58. The circuit 58 operates to stop the operation of the drive circuit 57 within an exposure time. Furthermore, the circuit 58 causes the image pickup element 54 to read the charge accumulated therein in synchronization with a pulse of the vertical synchronizing signal which occurs immediately after the exposure time has passed, whereupon circuit 58 causes the recording device 56 to start recording of the video signal VS. The video signal VS recording operation is started in response to a recording start signal SS.

Figure 8:
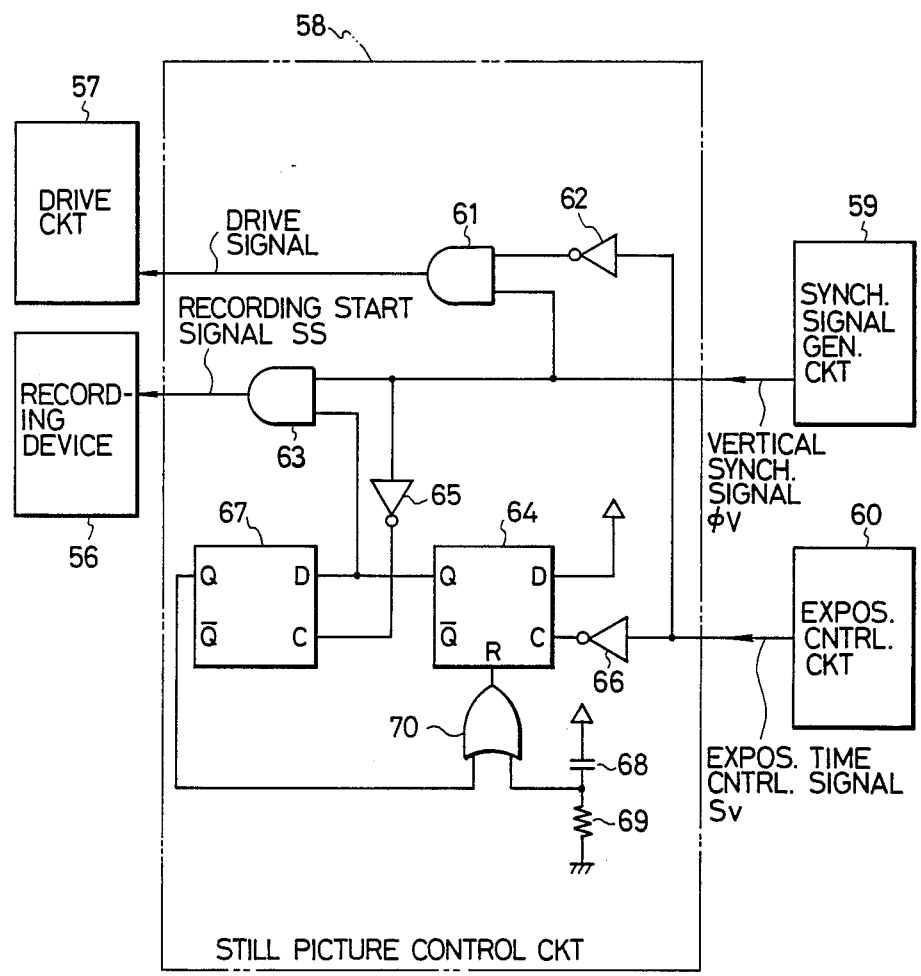
FIG. 8 is a circuit diagram of a still picture control circuit used in the arrangement of FIG. 7.

FIG. 8 shows a specific example of the still picture control circuit 58. In the circuit 58, an AND gate 61 receives a vertical synchronizing signal $\phi_{V1}$ or $\phi_{V2}$ from the synchronizing signal generating circuit 59 and the signal SV through an inverter 62 from the exposure control circuit 60. The vertical synchronizing signals $\phi_{V1}$ and $\phi_2$ have pulses which are produced alternately for every other line of picture elements in the image pickup element 54, that is, interlaced scanning is employed. These signals are represented by a vertical synchronizing signal $\phi_V$ in FIG. 8. The output of the AND 61 is connected to the drive circuit 57.

An AND gate 63 receives the vertical synchronizing signal $\phi_V$ and a noninverting output from a D-type flip-flop 64. The output signal of the AND gate 63 is applied, as a recording start signal SS, to the recording device 66. The C (clear) input terminal of the D-type flip-flop 64 is connected through an inverter 66 to the exposure control circuit 60. The noninverting output terminal of the flip-flop 64 is connected to a D input terminal of a D-type flip-flop 67. The C input terminal of the flip-flop 67 is connected through an inverter 65 to the synchronizing signal generating ciruit 59.

Further in FIG. 8, an OR gate 70 receives a noninverting output signal from the D-type flip-flop 67 and a signal from a differentiating circuit constituted by a capacitor 68 and a resistor 69. The output of the differentiating circuit is applied to the reset terminal R of the D-type flip-flop 64.

FIG. 9 is a timing chart describing the operation of the above-described device, which is as follows.

When the shutter button is depressed, a shutter signal RE is produced. Immediately after this, a photometric operation is carried out by a photometer (not shown), and an exposure time $t_r$ is determined according to the intensity of the image light. During the exposure time $t_r$, the operation of the drive circuit 57 is suspended, and therefore the accumulated charge of the image pickup element 54 is not read out during this time period. However, in synchronization with the first pulse of the vertical synchronizing signal $\phi_{V1}$ or $\phi_{V2}$ which occurs immediately after the exposure time $t_r$ has passed, the reading of the accumulated charge of the image pickup element 54 is started. At the same time, the recording operation by the recording device 56 of the video signal VS outputted by the signal processing circuit 56 is started.

In other words, when the shutter button is depressed, a correct exposure value is measured photometrically, and the exposure time control signal Sv has a high level for the exposure time $t_r$, which causes the diaphram 52 to open. During the exposure time, the diaphragm 52 is maintained open. The high level signal is applied to the inverter 62, and therefore the inverter 62 provides a low level signal. In this case, the AND gate 61 outputs a low level signal, and therefore, the operation of the drive circuit 57 is suspended. In other words, during the exposure time $t_r$ the drive circuit is not in operation, and accordingly the reading of the accumulated charge of the image pickup element 54 is not carried out. Thus, the exposure is carried out correctly according to the brightness of the object.

On the other hand, when the power switch is turned on, the differentiating circuit (68 and 69) outputs a pulse, which is applied through the OR gate 70 to the reset terminal R of the D-type flip-flop 64 to reset the flip-flop 64, so that the noninverting output signal thereof is set to the low level.

When the exposure time control signal Sv changes to the low level from the high level as described above, the low level signal is converted to a high level signal by the inverter 66. This high level signal is applied to the C input terminal of the D-type flip-flop 64. Accordingly, the noninverting output of the D-type flip-flop 64 is raised to the high level. This state is maintained unchanged for a time. Accordingly, the high level signal is applied to one input terminal of the AND gate 63. Immediately after this, a pulse of the vertical synchronizing signal $\phi_V$ (or $\phi_{V1}$ or $\phi_{V2}$), hereinafter referred to as "a vertical synchronizing signal a", is applied to the other input terminal of the AND gate 63 by the synchronizing signal generating circuit 59, whereupon the AND gate 63 outputs a high level signal. This high level signal is applied, as the recording start signal SS, to the recording device 56. Thus, the recording device 56 starts its operation in synchronization with the occurrence of the pulse of the vertical synchronizing signal a which occurs immediately after the exposure time control signal Sv has gone to its inactive state.

When the exposure time control signal Sv is set to the low level as described above, then the low level signal is converted to a high level signal by the inverter 62. The high level signal is applied to one input terminal of the AND gate 61. Immediately after this, a pulse of the vertical synchronizing signal a is applied to the other input terminal of the AND gate 61, whereupon the drive signal is produced to start the drive circuit 57, whereupon reading of the accumulated charge of the image pickup element 54 is carried out. This reading operation is started simultaneously with the start of the above-described recording operation.

When the vertical synchronizing signal a becomes inactive, the output signal of the inverter 65 is raised to the high level. This high level signal is applied to the C input terminal of the D-type flip-flop 67. As a result, the noninverting output signal of the circuit 67 is raised to the high level. This high level signal is applied through the OR gate 70 to the D-type flip-flop 64 to reset the latter. Accordingly, the noninverting output signal of the circuit 64 is set to the low level and the output signal of the AND gate 63 is also set to the low level. Accordingly, the recording start signal SS disappears, and the above-described circuit is restored to be ready for the next depression of the shutter button.

As is apparent from the above description, according to the invention, in providing a still picture video signal by using the area image sensor, a video signal can be obtained for a desired exposure time and a correct exposure can be selected. Therefore, with the solid-state image pickup device of the invention, no difficulties such as blooming and vertical smearing occur.

I claim:

1. A solid-state image pickup device comprising: an area image sensor; a drive circuit for applying to said area image sensor continuously and cyclically generated vertical synchronizing signals and continuously and cyclically generated horizontal synchronizing signals having predetermined periods; an exposure control circuit for providing an exposure time control signal for controlling an exposure time period according to the intensity of image light exposing said area image sensor; and a scanning stopping circuit for blocking application of said continuously and cyclically generated synchronizing signals from said drive circuit to said area image sensor to stop the scanning of said area image sensor for a period of time from a time instant before the start of exposure time period until the occurrence of a first pulse of said vertical synchronizing signal after the exposure time period ends.

2. The device as claimed in claim 1, wherein said scanning stopping circuit comprises means for stopping said scanning upon the start of the exposure time period.

3. The device as claimed in claim 1, wherein said scanning stopping circuit comprises means for stopping said scanning upon the occurrence of a first pulse of said continuously and cyclically generated vertical synchronizing signals following depression of a release button.

4. A still picture recording device, comprising:
an image pickup element;
a drive circuit for applying to said image pickup element continuously and cyclically generated vertical synchronizing signals and continuously and cyclically generated horizontal synchronizing signals having predetermined periods;
an exposure control circuit for providing an exposure time control signal, said exposure time control signal being adapted to control an exposure time of said image pickup element according to the intensity of image light;
a recording device for recording a video signal provided by said image pickup element; and
a still picture control circuit controlling the flow of said synchronizing signals from said drive circuit within said exposure time, said still picture control circuit comprising means for starting reading of a charge accumulated in said image pickup element in synchronization with a pulse of said vertical synchronizing signals which occurs immediately after said exposure time has ended, and simultaneously causing said recording member to start recording said video signal.

* * * * *